United States Patent
Lyons et al.

(10) Patent No.: US 11,580,253 B1
(45) Date of Patent: Feb. 14, 2023

(54) SYSTEM, METHOD, AND COMPUTER PROGRAM FOR CENTRALIZED CONSENT MANAGEMENT

(71) Applicant: Amdocs Development Limited, Limassol (CY)

(72) Inventors: Troy C. Lyons, Plano, TX (US); Royee Barak, Sunnyvale, CA (US); Hod Cohen, Tel Aviv-Jaffa (IL); Anders Rolff, Bray (IE); Nir Pedhazur, Petah Tikva (IL); Allon Dafner, Gedera (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 336 days.

(21) Appl. No.: 15/900,212

(22) Filed: Feb. 20, 2018

Related U.S. Application Data

(60) Provisional application No. 62/571,710, filed on Oct. 12, 2017, provisional application No. 62/563,548, (Continued)

(51) Int. Cl.
*G06F 21/62* (2013.01)
*G06Q 30/02* (2012.01)
*G06Q 30/0201* (2023.01)

(52) U.S. Cl.
CPC ..... *G06F 21/6245* (2013.01); *G06Q 30/0201* (2013.01)

(58) Field of Classification Search
CPC .......... G06F 21/6245; G06Q 30/0201
See application file for complete search history.

(56) References Cited

U.S. PATENT DOCUMENTS

| 7,873,710 B2 | 1/2011 | Kiley et al. |
| 8,156,206 B2 | 4/2012 | Kiley et al. |

(Continued)

OTHER PUBLICATIONS

Drgon et al.,"Privacy Management Reference Model and Methodology (PMRM) Version 1.0.," OASIS Committee Specification 02, May 17, 2016, pp. 37, as retrieved from http://docs.oasis-open.org/pmrm/PMRM/v1.0/cs02/PMRM-V1.0-cs02.html.

(Continued)

*Primary Examiner* — Trang T Doan
*Assistant Examiner* — Vladimir I Gavrilenko
(74) *Attorney, Agent, or Firm* — Zilka-Kotab, P.C.

(57) ABSTRACT

A system, method, and computer program product are provided for centralized consent management. In operation, the consent management system receives user selections from a user indicating which user data is capable of being utilized for analysis by a company. The consent management system stores the user selections of which user data is capable of being utilized for analysis by the company in a consent database. The consent management system generates a consent vector corresponding to the user selections of which user data is capable of being utilized for analysis by the company. Additionally, the consent management system associates the consent vector with a consent vector identification. Further, the consent management system tags incoming data with the consent vector identification to associate a user consent with the incoming data. The consent management system stores and encodes the incoming data. Moreover, the consent management system enforces consent restrictions by conditionally allowing access to the stored data by the company based on corresponding consent vector identifications.

10 Claims, 6 Drawing Sheets

Related U.S. Application Data filed on Sep. 26, 2017, provisional application No. 62/462,806, filed on Feb. 23, 2017.

(56) References Cited

U.S. PATENT DOCUMENTS

| | | | |
|---|---|---|---|
| 8,725,851 B2 | 5/2014 | Kiley et al. | |
| 8,959,190 B2 | 2/2015 | Kiley et al. | |
| 10,726,342 B2* | 7/2020 | Saxena | G06N 5/04 |
| 10,733,685 B1* | 8/2020 | Gailloux | H04W 12/02 |
| 2010/0250285 A1* | 9/2010 | Shelton | G06Q 30/0201 |
| | | | 705/3 |
| 2012/0254320 A1* | 10/2012 | Dove | G16H 10/60 |
| | | | 709/206 |
| 2015/0161413 A1* | 6/2015 | Calem | H04L 63/0428 |
| | | | 705/51 |
| 2015/0213195 A1* | 7/2015 | Blechman | G16H 10/60 |
| | | | 705/51 |
| 2016/0132696 A1* | 5/2016 | Vidhani | G06F 21/6245 |
| | | | 726/28 |
| 2018/0219685 A1* | 8/2018 | Deery | H04L 63/123 |
| 2019/0004999 A1* | 1/2019 | Kawamoto | G06F 17/16 |
| 2019/0188312 A1* | 6/2019 | Pandit | G06N 3/08 |

OTHER PUBLICATIONS

ISO, "What is a standard?," Jan. 28, 2017, pp. 1-3, as retrieved by the Internet Archive Wayback Machine, https://web.archive.org/web/20170128133652/http://www.iso.org/iso/home/standards.htm.

NIST, "Risk management framework (RMF)—frequently asked questions (FAQ's), Roles and responsibilities & quick start guides (QSG's)," Jan. 24, 2017, pp. 1-4, as retrieved by the Internet Archive Wayback Machine, https://web.archive.org/web/20170124142338/hap://csrc.nist.gov/groups/SMA/fisma/Risk-Management-Framework/index.html.

Brooks et al., "NISTIR 8062: An Introduction to Privacy Engineering and Risk Management in Federal Systems," National Institute of Standards and Technology, Jan. 2017, pp. 1-49, retrieved from https://doi.org/10.6028/NIST.IR.8062.

OECD, "OECD Guidelines on the Protection of Privacy and Transborder Flows of Personal Data," 2013, pp. 1-15, retrieved from http://www.oecd.org/sti/ieconomy/oecdguidelinesontheprotectionofprivacyandtransborderflowsofpersonaldata.htm.

* cited by examiner

SYSTEM, METHOD, AND COMPUTER PROGRAM FOR CENTRALIZED CONSENT MANAGEMENT

CLAIM OF PRIORITY AND RELATED APPLICATIONS

This application claims the benefit of: U.S. Provisional Application No. 62/462,806, filed Feb. 23, 2017; U.S. Provisional Application No. 62/563,548, filed Sep. 26, 2017; and U.S. Provisional Application No. 62/571,710, filed Oct. 12, 2017, the entire contents of each application are incorporated herein by reference.

FIELD OF THE INVENTION

The present invention relates to consent management, and more particularly to a consent management system that records, tracks, and enforces customer consent at the data level.

BACKGROUND

Companies collect a wealth of information about their customers in the course of their primary product and service offerings. This data is extremely valuable when analyzed for secondary services such as advertising, personalization, and new services. This data cannot be fully utilized without a customer's consent. Current consent management systems fail to provide comprehensive functionality for recording, tracking, and enforcing customer consent at the data level, while providing the customer with the control and transparency of what businesses do with their secondary data.

There is thus a need for addressing these and/or other issues associated with the prior art.

SUMMARY

A system, method, and computer program product are provided for centralized consent management. In operation, the consent management system receives user selections from a user indicating which user data is capable of being utilized for analysis by a company. The consent management system stores the user selections of which user data is capable of being utilized for analysis by the company in a consent database. The consent management system generates a consent vector corresponding to the user selections of which user data is capable of being utilized for analysis by the company. Additionally, the consent management system associates the consent vector with a consent vector identification. Further, the consent management system tags incoming data with the consent vector identification to associate a user consent with the incoming data. The consent management system stores and encodes the incoming data. Moreover, the consent management system enforces consent restrictions by conditionally allowing access to the stored data by the company based on corresponding consent vector identifications.

DETAILED DESCRIPTION

Figure 1:
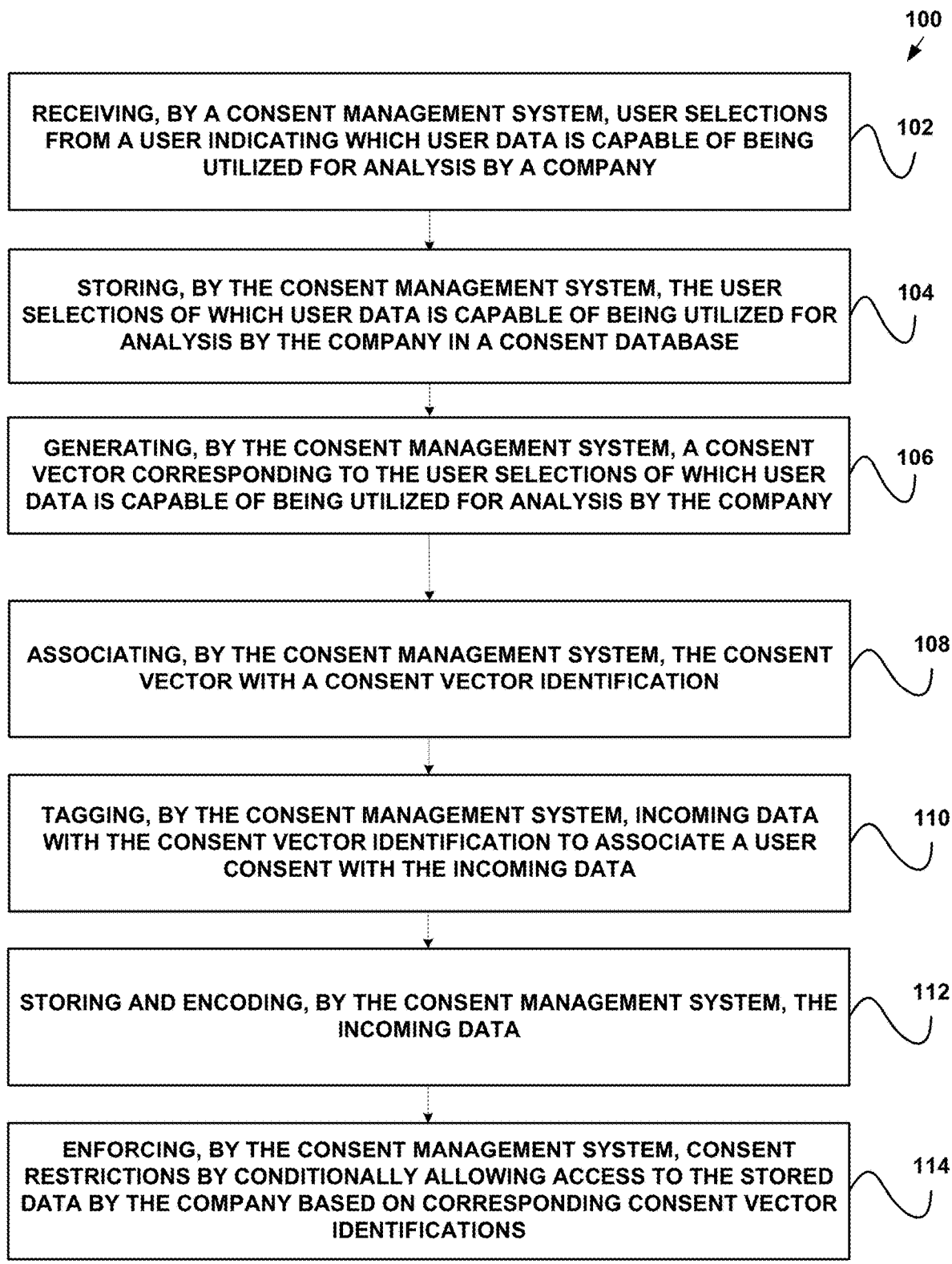
FIG. 1 illustrates a method for centralized consent management, in accordance with one embodiment.

FIG. 1 illustrates a method 100 for centralized consent management, in accordance with one embodiment.

In operation, the consent management system receives user selections from a user indicating which user data is capable of being utilized for analysis by a company. See operation 102. For example, the consent management system may display (or cause the display of) at least one user interface allowing the user to select which user data is capable of being utilized for analysis by the company.

The consent management system stores the user selections of which user data is capable of being utilized for analysis by the company in a consent database. See operation 104. The data may be any type of data, such as personal data, and data associated with data programs, data sources, and/or data products, etc.

The consent management system generates a consent vector corresponding to the user selections of which user data is capable of being utilized for analysis by the company. See operation 106. In one embodiment, the consent vector may include includes a set of bits. In this case, each bit may be a true or false value indicating whether an entity is permitted to use a data item for a particular user. The entity may include, for example, one or more companies, data programs, data sources, and/or data products, etc.

Additionally, the consent management system associates the consent vector with a consent vector identification. See operation 108. Further, the consent management system tags incoming data with the consent vector identification to associate a user consent with the incoming data. See operation 110. In one embodiment, the consent vector identification may be used to distinguish and track multi-company shared data stores to ensure that consent from separate sources are aligned with directives given to a collecting company and co-exist with other collectors and consent to be combined and used in accordance with consumer directives. Further, in one embodiment, the consent management system may utilize a private data locker implementing blockchain technology that is used to give users control over corresponding data.

The consent management system stores and encodes the incoming data (e.g. utilizing a public/private key technique). See operation 112. Moreover, the consent management system enforces consent restrictions by conditionally allowing access to the stored data by the company based on corresponding consent vector identifications. See operation 114. Thus, if the consent vector identifications indicate particular data is permitted (by the user) to be used by a particular entity, the consent management system allows the use. If the consent vector identifications indicate particular data is not permitted (by the user) to be used by a particular entity, the consent management system does not allow the use.

The consent management system implementing the method 100 records, tracks, and enforces customer consent at the data level and provides the customer with the control and transparency of what businesses do with their secondary data. This data level consent management allows businesses to use the secondary data in a way that brings consumer trust and legal compliance.

The consent management system may be utilized for classifying and encapsulating all consent and enforcement by data programs, data sources, and data products to align the legal, business, and technological areas.

It should be noted that the method 100 may be implemented utilizing various systems, hardware, software, applications, user interfaces, etc., as dictated by the implementer. For example, the consent management system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
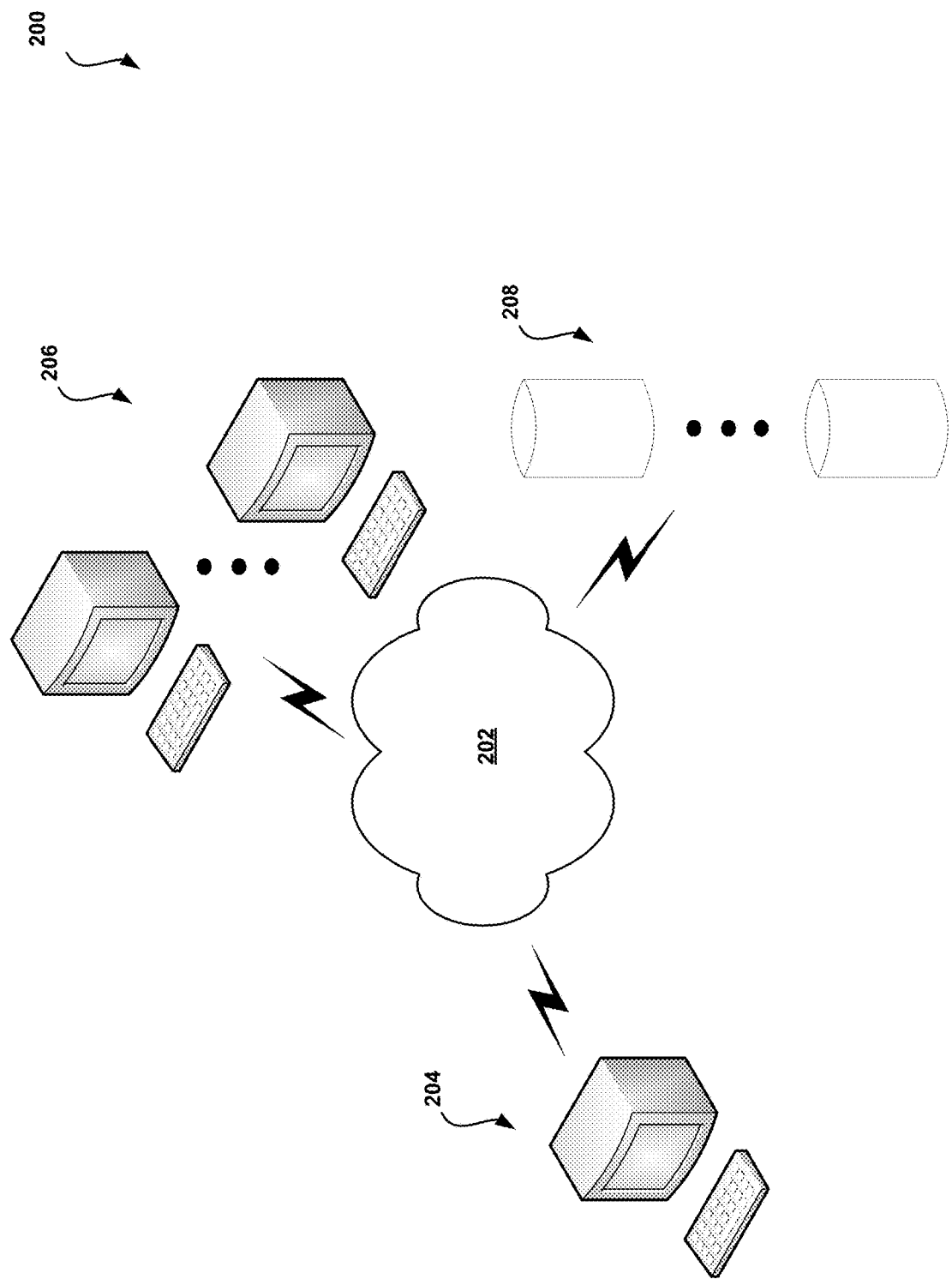
FIG. 2 shows a system for centralized consent management, in accordance with one embodiment.

FIG. 2 shows a system 200 for centralized consent management, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a consent management system 204, which may implement a variety of applications or software, etc. The consent management system 204 may be capable of communicating with a plurality of systems 206 (e.g. user systems, etc.), either directly or over one or more networks 202, for performing centralized consent management. The system 204 may also be in communication with one or more repositories/databases 208, which may include a consent database, a data lake, and/or a private data locker, etc.

At the core of consent management is the ability to enforce consent at the data level. The consent management system 204 provides this capability by masking data in such a way that customer data can only be accessed on behalf of customers who have opted-in. This detaches the data from specific data programs, data products, or consent definitions. The storage of data is also detached from the usage of data.

In operation, the consent management system 204 generates a consent vector corresponding to user selections of which user data is capable of being utilized by one or more companies. The consent management system 204 associates the consent vector with a consent vector identification. Further, the consent management system tags incoming data with the consent vector identification to associate a user consent with the incoming data.

The consent vector records the intersection of consent, data programs, data sources, and data products for each customer (account and subscriber) and it is the definition for what a customer has opted in or out. A change to the consent vector immediately impacts the data that applications can access, so the customer is always in control.

In one embodiment, the consent vector may consist of a set of bits. In this case, each bit may be a true/false value answering: Is <DataProgram> allowed to use <DataSource> for user <UID>.

In one embodiment, the consent vector ID may be a number assigned to the account level of the data subject(s) of the data controller. This number can be generated by the consent management system 204, which may be associated with the operational ID (OPID) of the same data subject(s)/account of the controller. In one embodiment, the consent vector ID may be the same as the OPID in a closed system. However, to preserve the tokenization if data is shared, the consent vector ID may be generated by the consent management system. The consent vector ID may be associated with a household account where multiple people are associated with the account. In systems where there is no account in the business model, this may be an ID of a registered user(s).

The consent vector identification may be used to distinguish and track multiple company shared data stores to ensure that consent from separate sources are aligned with the directives given to the collecting company and yet still co-exist with other collectors and consent to be combined and used in accordance to consumer directives.

The consent management system 204 may be utilized for classifying/encapsulating all consent and enforcement by the data programs, data sources, and data products to align the legal, business, and tech areas. The consent management system allows companies to correlate the physical data tagging to the intangible legal language and business purposes for which the consent is being requested.

Figure 3:
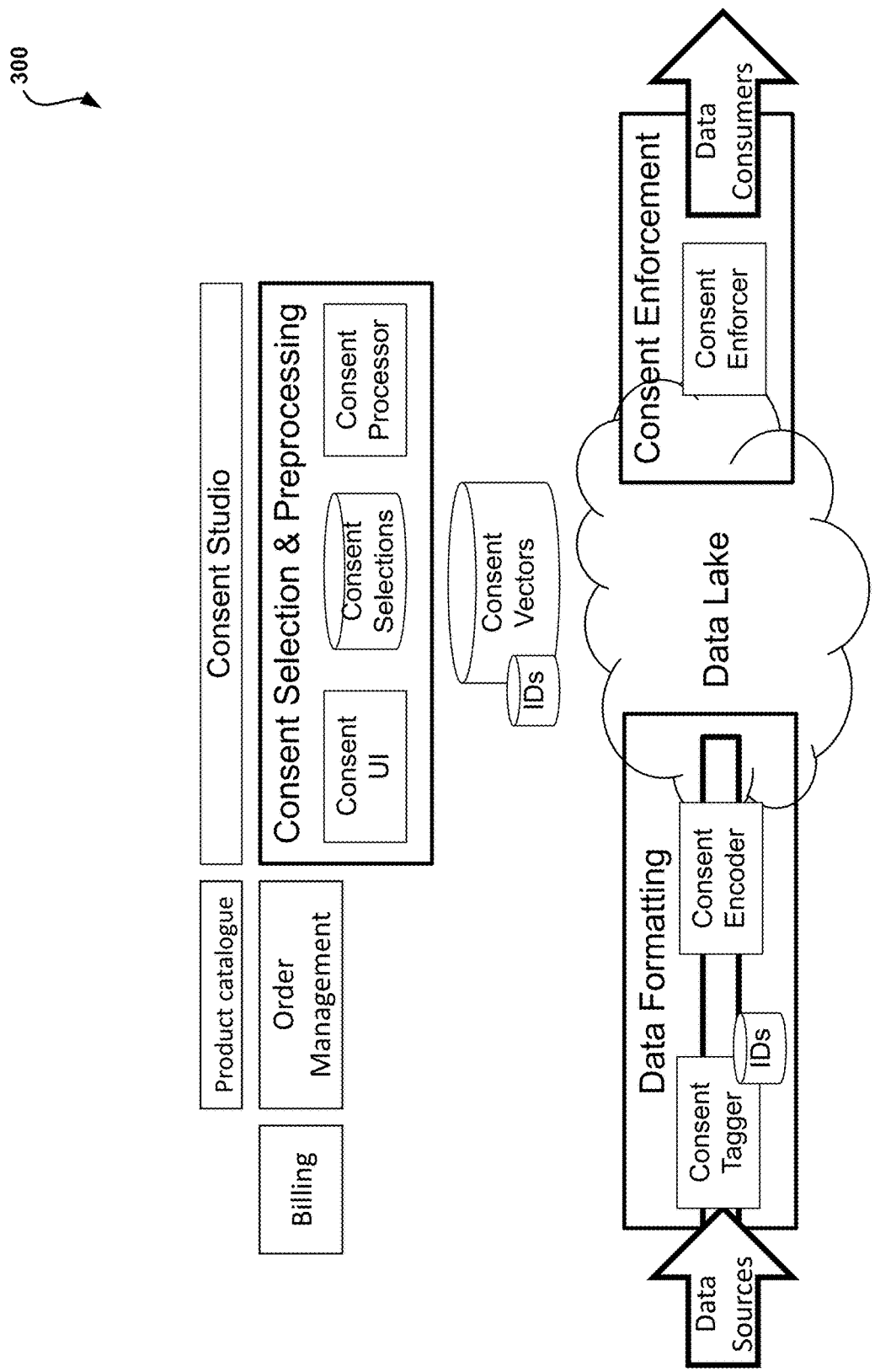
FIG. 3 shows a consent management system for centralized consent management, in accordance with one embodiment.

FIG. 3 shows a high level diagram of a consent management system 300, in accordance with one embodiment. As an option, the consent management system 300 may be implemented in the context of the details of the previous figures and/or any subsequent figure(s). Of course, however, the consent management system 300 may be implemented in the context of any desired environment. Further, the aforementioned definitions may equally apply to the description below.

The consent management system 300 implements a methodology for classifying three tiers or levels of data in an analytic relationship hierarchy as data moves from primary data to personalized secondary data. The consent management system 300 implements a method to interact with customers and provides a system that will win customer trust and provide value. The consent management system 300 establishes a framework for identifying where in the hierarchy consent is needed and what measures need to be applied to maintain legal compliance.

In various embodiments, the consent management system 300 may include and/or employ a Consent Studio, a Consent Vector Creation module, a Consent Identity Matcher, a Consent Tagger, a Consent Encoding module, an xIdentity Anonymization module, a Consent Enforcer, a customer consented profile viewer/updater, co-managed B2B data sharing, co-managed C2B data sharing, and a Private Data Locker for IoT Data as sovereign data.

The Consent Studio allows for integration with privacy policy management and legal conditions, as well as integration with billing systems and a product catalogue. The Consent Vector Creation module employs a consent processor as well as private key management.

The Consent Identity Matcher allows for source identification, identification of Consent Vector ID, PseudoID, and SPINoTID. The Consent Tagger performs ID tagging and source tagging. The Consent Encoding module utilizes a public key for encoding.

The xIdentity Anonymization module removes the identity from the data, PII, CPNI, and SPI. The Consent Enforcer performs data destination registry, read/analyze enforcement, and delete enforcement. The Private Data Locker for IoT Data as sovereign data serves as consent management, an analytic broker, and a data broker, and may also employ plugins for Device Management/IAM/SSO.

The Private Data Locker may be used to give individuals control over their data in a private store that can be tied to a company's consent management system for C2B2B (customer to business to business) exchanges of data or usage of profiles. The locker may also allow a private processing space for external algorithms to be run privately to return conclusions without an exchange of data with BYOA (bring your own analytics). This may be referred to stationary data shielding to denote that the data is not exchanged and is shielded from external parities with the benefit of analysis. In one embodiment, the data broker of the private data locker may work utilizing blockchain technology and other secure methods to track and secure the exchange of data both incoming data and outgoing data with external (to the customer and data collector).

Current consent management solutions merely record what customers would like to consent to, but they do not enforce that consent at the data level. Most web based solutions effectively are 'do not disturb' marketing blockers. If the business has data on them, they still may analyze a customer's data, even if the customer opted out of analysis. They achieve this level by cookie consent and tag management, which may turn off collection of data from cookies (but not logs) or keep data from being sent to third parties. They do not deal with data coming in from other channels, as does the consent management system 300, such as log files, Call Detail Records (CDRs), Event Detail Records (EDRs), Set Top Boxes (STB), DNS logs, browsing history, geo location data derived by a service provider, and various other data sources.

The consent management system 300 manages consent at a secondary data level across big data stores used for analytic processing. Most companies cannot comply with a right to be forgotten delete request because they have no way to ensure with auditable compliance that they deleted all instances of secondary data. The consent management system 300 records where data has been moved as the data enforcer grants rights to process/use the data. This may be accomplished by either a data registry for batch moved processing or a blockchain audit of what system requested the data for usage as a location to search for deletion of a right to be forgotten scenario.

The consent management system 300 gives the control of what data can be used (analyzed) for what purpose. This granularity and encoding also allows a business to store personal data that will only be used when someone opts in. This allows the company to have enough data to power a personalized service within hours, instead of waiting to collect six months of data. The consent management system 300 also allows for consent to be removed and, immediately after, cause the stop of all processing of a customer's data. The anonymization process utilized by the consent management system 200 also allows for full pseudo anonymization and the ability to delete a specific customer's anonymized data if that customer opts out.

Figure 4:
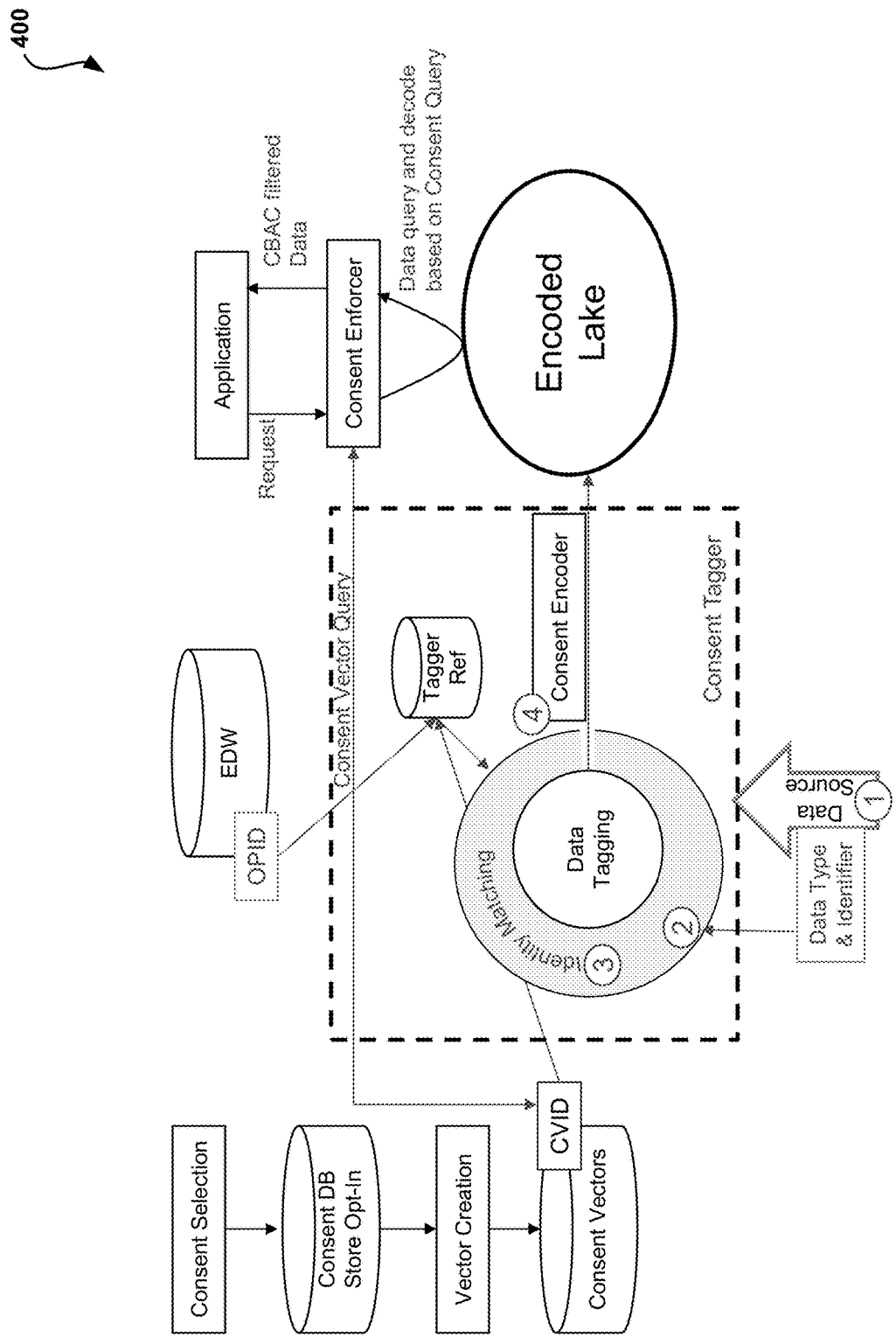
FIG. 4 shows a consent management system flow diagram for centralized consent management, in accordance with one embodiment.

FIG. 4 shows a high level diagram of a consent management system work flow 400, in accordance with one embodiment. As an option, the consent management system work flow 400 may be implemented in the context of the details of the previous figures and/or any subsequent figure(s). Of course, however, the consent management system work flow 400 may be implemented in the context of any desired environment. Further, the aforementioned definitions may equally apply to the description below.

The consent management system may present a personal data management page that gives a user the ability to choose to opt in and opt out of data being used for analytic purposes. This page may also show the customer an associated consented profile and give the option to add or remove descriptions.

The consent database may be used to store customer selections in data usage. The vector creator may allow for creation of a consent vector and association with a consent vector ID.

The consent vector database may store the consent vectors for tagging and enforcing. The data tagger may tag incoming data with the consent vector ID. This may require the identity of the data with the customer and matching that with the OPID and consent vector ID.

The data encoder may encode data with a public/private key method. In this case, the public key may go with data in the encoded lake and the consent vector ID may be viewable outside of consent.

A data viewer may include a web page that allows a user to view consented data by requesting usage intent and query. The consent enforcer may receive the request and query the consent vector database for vectors that give the requested consent. The consent enforcer may return a consent vector ID that will be used to filter the data query.

In operation, data flows to the tagger. See step 1. The data source is identified along with the key value. See step 2.

Further, identity matching is performed. See step 3. In this case, three values need to be matched with the end result being a correct consent vector ID tagged to the data. Each type of data will have a key that identifies the customer. The data source and key will need to be matched with the operational ID or universal customer ID. Reference tables that may be used to look up the key types, which will need to accommodate both household and device distinctions. The operational ID needs to be matched with the consent vector ID.

The data may be low level encrypted with a public and private key. See step 4. The consent vector ID should be queried without decryption.

Figure 5:
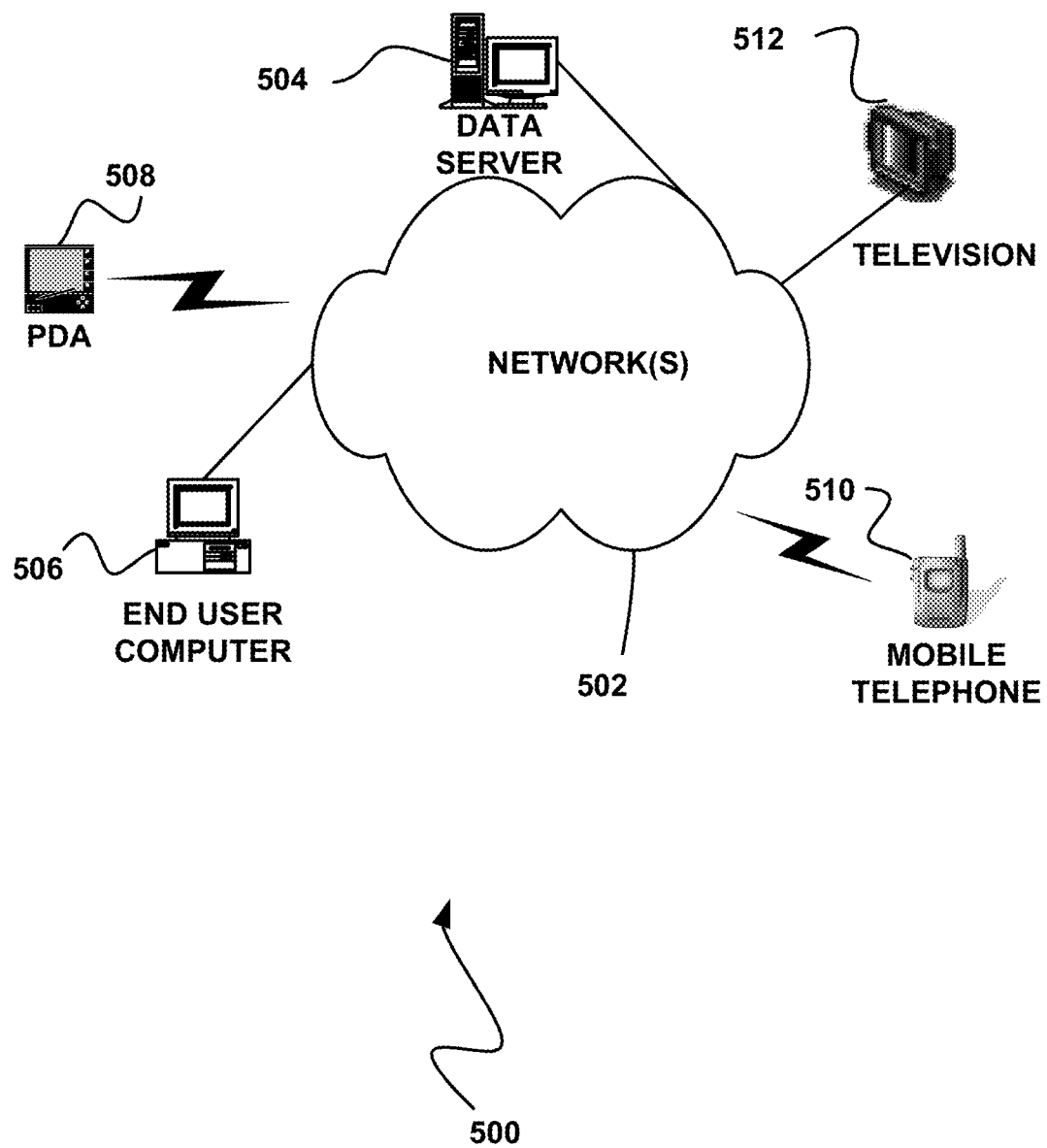
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
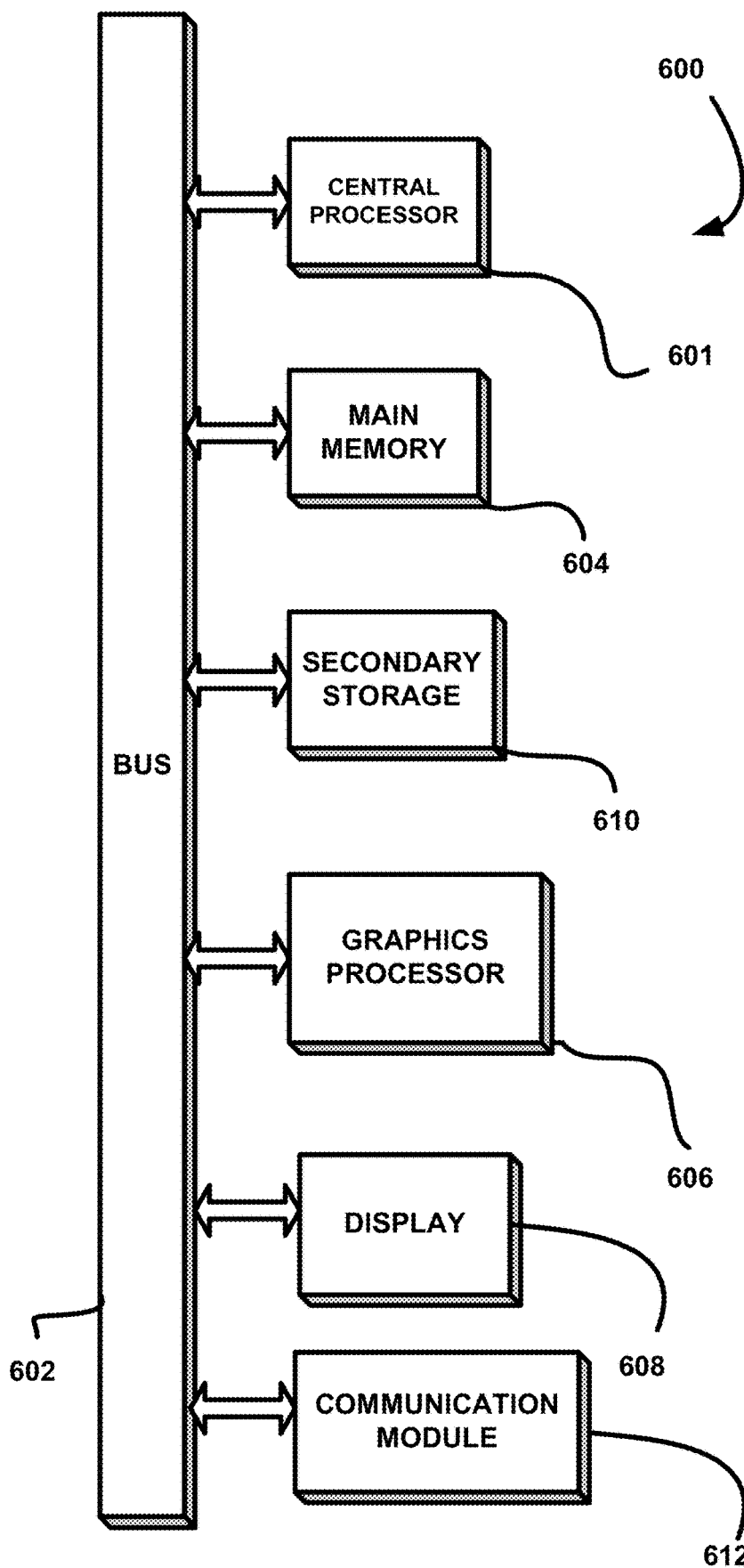
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a consent management system, user selections from a user indicating which user data the user consents to being accessed by one or more third parties;
   storing, by the consent management system in a consent database, the user selections indicating which user data the user consents to being accessed by the one or more third parties;
   generating, by the consent management system, a consent vector defining the user selections indicating which user data the user consents to accessed by the one or more third parties, wherein the consent vector records an intersection of the indications of which user data the user consents to being accessed by the one or more third parties and additional indications of which data programs, data sources, and data products the user consents to being utilized by the one or more third parties for accessing portions of the user data the user consents to being accessed by the one or more third parties;
   associating, by the consent management system, an identifier with the consent vector for use in identifying the consent vector;
   receiving, by the consent management system, incoming data associated with the user;
   tagging, by the consent management system, the incoming data with the identifier of the consent vector to associate the user selections with the incoming data;
   storing and encoding, by the consent management system, the incoming data tagged with the identifier of the consent vector;
   enforcing, by the consent management system, consent restrictions by conditionally allowing access to the stored data by the one or more third parties based on the user selections associated with the incoming data via the tagging, including:
      receiving, by the consent management system, a request from a third party of the one or more third parties to view the user data,
      querying, by the consent management system, a consent vector database for the consent vector defining the user selections indicating which of the user data the user consents to being accessed by the one or more third parties,
      receiving, by the consent management system in response to the query of the consent vector database, the identifier of the consent vector, and
      using, by the consent management system, the identifier of the consent vector to filter the user data requested by the third party of the one or more third parties, and
      returning, by the consent management system, the filtered user data to the third party of the one or more third parties;
   recording, by the consent management system in a blockchain, that the filtered user data has been returned to the third party of the one or more third parties;
   receiving, by the consent management system, a request that the user data be forgotten by the one or more third parties;
   in response to the request that the user data be forgotten by the one or more third parties, searching, by the consent management system, the blockchain to determine that the filtered user data was previously returned to the third party of the one or more third parties; and
   in response to determining that the filtered user data was previously returned to the third party of the one or more third parties, causing, by the consent management system, the third party of the one or more third parties to delete the filtered user data that was returned to the third party of the one or more third parties.

2. The method of claim 1, wherein the consent vector includes a set of bits.

3. The method of claim 1, wherein the consent vector includes a set of bits, where each bit is a true value or a false value indicating whether an entity is permitted to use a data item of the user data.

4. The method of claim 1, wherein a change to the consent vector immediately impacts the user data that entities can access.

5. A computer program product embodied on a non-transitory computer readable medium, comprising computer code for:
   receiving, by a consent management system, user selections from a user indicating which user data the user consents to being accessed by one or more third parties;
   storing, by the consent management system in a consent database, the user selections indicating which user data the user consents to being accessed by the one or more third parties;
   generating, by the consent management system, a consent vector defining the user selections indicating which user data the user consents to accessed by the one or more third parties, wherein the consent vector records an intersection of the indications of which user data the user consents to being accessed by the one or more third parties and additional indications of which data programs, data sources, and data products the user consents to being utilized by the one or more third parties for accessing portions of the user data the user consents to being accessed by the one or more third parties;
   associating, by the consent management system, an identifier with the consent vector for use in identifying the consent vector;
   receiving, by the consent management system, incoming data associated with the user;
   tagging, by the consent management system, the incoming data with the identifier of the consent vector to associate the user selections with the incoming data;
   storing and encoding, by the consent management system, the incoming data tagged with the identifier of the consent vector;

enforcing, by the consent management system, consent restrictions by conditionally allowing access to the stored data by the one or more third parties based on the user selections associated with the incoming data via the tagging, including:
  receiving, by the consent management system, a request from a third party of the one or more third parties to view the user data,
  querying, by the consent management system, a consent vector database for the consent vector defining the user selections indicating which of the user data the user consents to being accessed by the one or more third parties,
  receiving, by the consent management system in response to the query of the consent vector database, the identifier of the consent vector, and
  using, by the consent management system, the identifier of the consent vector to filter the user data requested by the third party of the one or more third parties, and
  returning, by the consent management system, the filtered user data to the third party of the one or more third parties;
recording, by the consent management system in a blockchain, that the filtered user data has been returned to the third party of the one or more third parties;
receiving, by the consent management system, a request that the user data be forgotten by the one or more third parties;
in response to the request that the user data be forgotten by the one or more third parties, searching, by the consent management system, the blockchain to determine that the filtered user data was previously returned to the third party of the one or more third parties; and
in response to determining that the filtered user data was previously returned to the third party of the one or more third parties, causing, by the consent management system, the third party of the one or more third parties to delete the filtered user data that was returned to the third party of the one or more third parties.

6. The computer program product of claim 5, wherein the consent vector includes a set of bits.

7. The computer program product of claim 5, wherein the consent vector includes a set of bits, where each bit is a true value or a false value indicating whether an entity is permitted to use a data item of the user data.

8. A consent management system, comprising:
a non-transitory memory storing instructions; and
one or more processors in communication with the non-transitory memory, wherein the one or more processors execute the instructions to perform a method comprising:
receiving, by the consent management system, user selections from a user indicating which user data the user consents to being accessed by one or more third parties;
storing, by the consent management system in a consent database, the user selections indicating which user data the user consents to being accessed by the one or more third parties;
generating, by the consent management system, a consent vector defining the user selections indicating which user data the user consents to accessed by the one or more third parties, wherein the consent vector records an intersection of the indications of which user data the user consents to being accessed by the one or more third parties and additional indications of which data programs, data sources, and data products the user consents to being utilized by the one or more third parties for accessing portions of the user data the user consents to being accessed by the one or more third parties;
associating, by the consent management system, an identifier with the consent vector for use in identifying the consent vector;
receiving, by the consent management system, incoming data associated with the user;
tagging, by the consent management system, the incoming data with the identifier of the consent vector to associate the user selections with the incoming data;
storing and encoding, by the consent management system, the incoming data tagged with the identifier of the consent vector;
enforcing, by the consent management system, consent restrictions by conditionally allowing access to the stored data by the one or more third parties based on the user selections associated with the incoming data via the tagging, including:
  receiving, by the consent management system, a request from a third party of the one or more third parties to view the user data,
  querying, by the consent management system, a consent vector database for the consent vector defining the user selections indicating which of the user data the user consents to being accessed by the one or more third parties,
  receiving, by the consent management system in response to the query of the consent vector database, the identifier of the consent vector, and
  using, by the consent management system, the identifier of the consent vector to filter the user data requested by the third party of the one or more third parties, and
  returning, by the consent management system, the filtered user data to the third party of the one or more third parties;
recording, by the consent management system in a blockchain, that the filtered user data has been returned to the third party of the one or more third parties;
receiving, by the consent management system, a request that the user data be forgotten by the one or more third parties;
in response to the request that the user data be forgotten by the one or more third parties, searching, by the consent management system, the blockchain to determine that the filtered user data was previously returned to the third party of the one or more third parties; and
in response to determining that the filtered user data was previously returned to the third party of the one or more third parties, causing, by the consent management system, the third party of the one or more third parties to delete the filtered user data that was returned to the third party of the one or more third parties.

9. The consent management system of claim 8, wherein the consent vector includes a set of bits.

10. The consent management system of claim 8, wherein the consent vector includes a set of bits, where each bit is a true value or a false value indicating whether an entity is permitted to use a data item of the user data.

* * * * *